United States Patent [19]

Kluge

[11] Patent Number: 5,779,342
[45] Date of Patent: Jul. 14, 1998

[54] DEVICE FOR ADJUSTING THE LEVEL OF A VEHICLE HEADLIGHT

[75] Inventor: Reinhold Kluge, Hallbergmoos, Germany

[73] Assignee: Bayerische Motoren Werke Aktiengellschaft, Munich, Germany

[21] Appl. No.: 632,369

[22] Filed: Apr. 10, 1996

[30] Foreign Application Priority Data

Apr. 10, 1995 [DE] Germany .................... 195 13 554.7

[51] Int. Cl.⁶ .................................................. B60Q 1/06
[52] U.S. Cl. .......................... 362/66; 362/276; 362/802
[58] Field of Search ............................ 362/66, 287, 418, 362/276, 802; 310/49 R, 68 C

[56] References Cited

U.S. PATENT DOCUMENTS 5,181,429  1/1993  Sieber ........................ 74/89.15

FOREIGN PATENT DOCUMENTS

| 0 468 920 | 1/1992 | European Pat. Off. . |
| 2117083 | 7/1972 | France . |
| 2175250 | 10/1973 | France . |
| 40 17 856 | 12/1991 | Germany . |
| 92 03 903.0 U | 5/1992 | Germany . |

*Primary Examiner*—Ira S. Lazarus
*Assistant Examiner*—Nhat-Hang H. Lam
*Attorney, Agent, or Firm*—Evenson, McKeown, Edwards & Lenahan, P.L.L.C.

[57] ABSTRACT

In a device for adjusting the tilt of a motor vehicle headlight, using a stepping motor that adjusts the inclination of the headlight as a drive motor which is controlled in accordance with a tilt set value, the stepping frequency of the stepping motor, depending on the headlight operating temperature, is smaller for low temperatures than for higher temperatures.

5 Claims, 2 Drawing Sheets

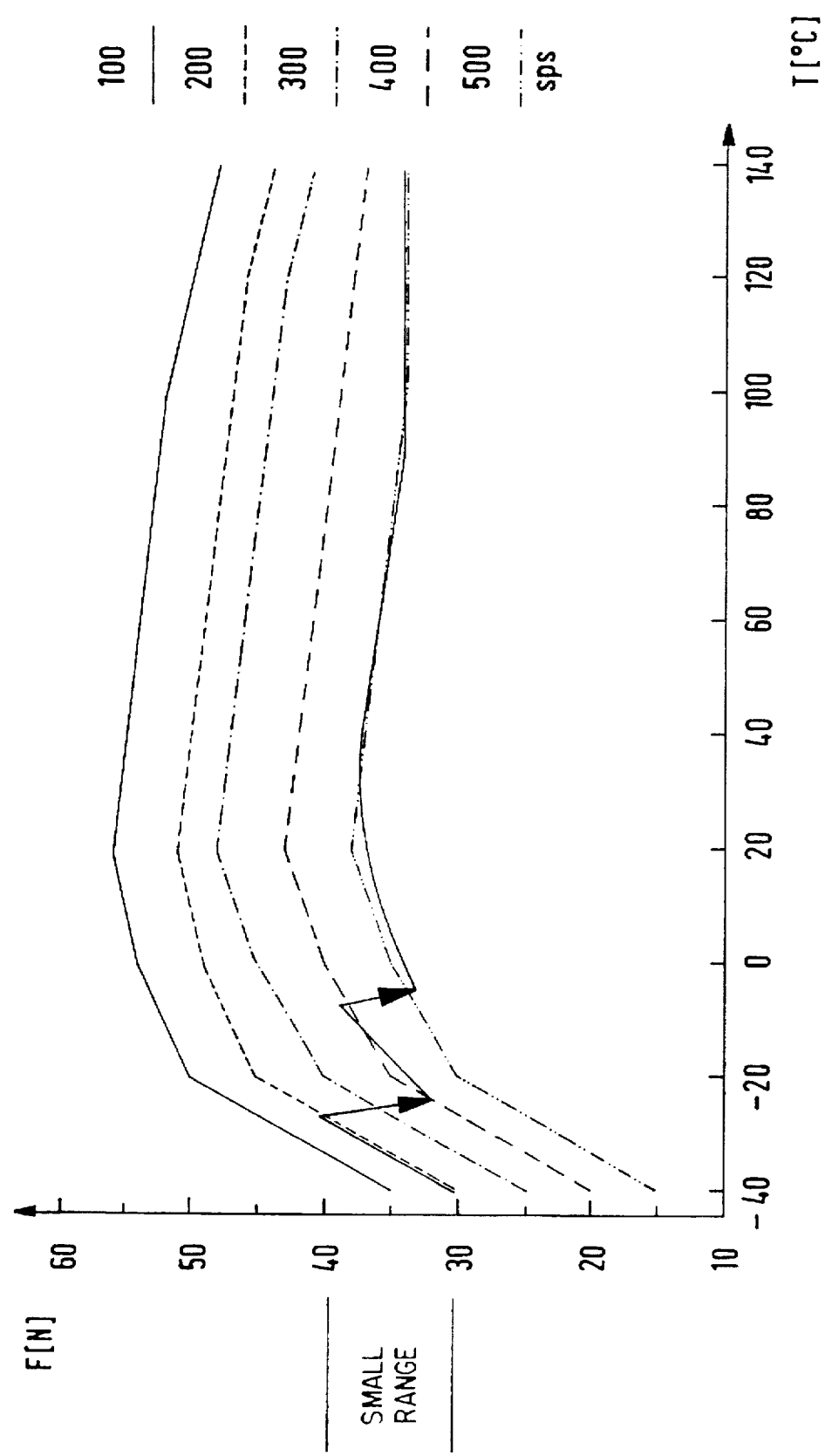

1

DEVICE FOR ADJUSTING THE LEVEL OF A VEHICLE HEADLIGHT

BACKGROUND AND SUMMARY OF THE INVENTION

The invention relates to a device for adjusting the tilt level of a motor vehicle headlight using a stepping motor that adjusts the tilt or inclination of the headlight. The motor serves as a drive motor that is controlled in accordance with a set tilt value.

When a stepping motor is used as a drive motor, the problem of a stepping loss can arise. This acts directly on the adjustment of the headlight tilt or inclination. Since the adjustment must be performed with high precision, a position sensor could be helpful. However, this is cost-intensive and likewise prone to failure. To avoid stepping losses, the motor current could be increased. The resultant increase in positioning force can result, especially at higher temperatures, in mechanically adverse effects on the headlight, the motor, and the lighting device.

It has already been proposed in German Patent document DE 40 17 856 A1 to perform a reference pass when turning on the headlight in order to avoid a stepping loss. In this process, the headlight is moved against the stop and, from there, the tilt of the headlight is adjusted to the set value. During this adjustment, however, a stepping loss can likewise occur and the adjustment of the headlight will then not be correct. The problem of a stepping loss occurs in particular at low operating temperatures of the headlight. Such temperatures, −40° C. for example, frequently occur in many countries. The use of suitable lubricants as a rule does not apply, since these have disadvantages at high operating temperatures of the headlight, like those which occur during prolonged operation of the headlight. At such high operating temperatures, the lubricants evaporate and precipitate in and on the headlight. Cleaning the headlight is only possible within very narrow limits, if at all.

There is therefore needed a device which ensures that the operation of the stepping motor is as free as possible of stepping losses and mechanical problems at all headlight operating temperatures.

The present invention meets these needs by providing a device for adjusting the tilt level of a motor vehicle headlight using a stepping motor that adjusts the tilt or inclination of the headlight. The motor serves as a drive motor that is controlled in accordance with a set tilt value. The stepping frequency of the stepping motor, depending on the headlight operating temperature, is smaller for low temperatures than for higher temperatures.

Taking the operating temperature of the headlight into account makes it possible to keep the operating force largely independent of the operating temperature of the headlight within a narrow tolerance range. This is based on the fact that the actuating force is dependent on the stepping frequency as well as the operating temperature of the headlight and/or stepping motor. The term "stepping frequency" is understood to be the number of steps per unit time, for example 100 to 500 steps per second. By equalizing the actuating force of the drive motor, the set number of steps is performed with a high degree of reliability by the stepping motor even at low temperatures and the disadvantage of stepping forces that are too high at 20° C. is avoided.

The operating temperature of the headlight or the stepping motor can be determined by a separate temperature sensor at the headlight itself or at the stepping motor. On the other hand, a significant cost reduction is achieved if the critical operating temperature is determined indirectly. The temperature information can be obtained from the outside temperature and/or an internal temperature of a part of the vehicle, for example the coolant in an internal combustion engine. The operating time of the headlight itself can be taken into account in addition or alternatively.

Other objects, advantages and novel features of the present invention will become apparent from the following detailed description of the invention when considered in conjunction with the accompanying drawings.

BRIEF DESCRIPTION OF THE DRAWINGS

FIG. 2 is a graphical illustration of the relationship between the operating force of the headlight and the temperature of the stepping motor and/or the headlight for different stepping frequencies.

DETAILED DESCRIPTION OF THE DRAWINGS

Figure 1:
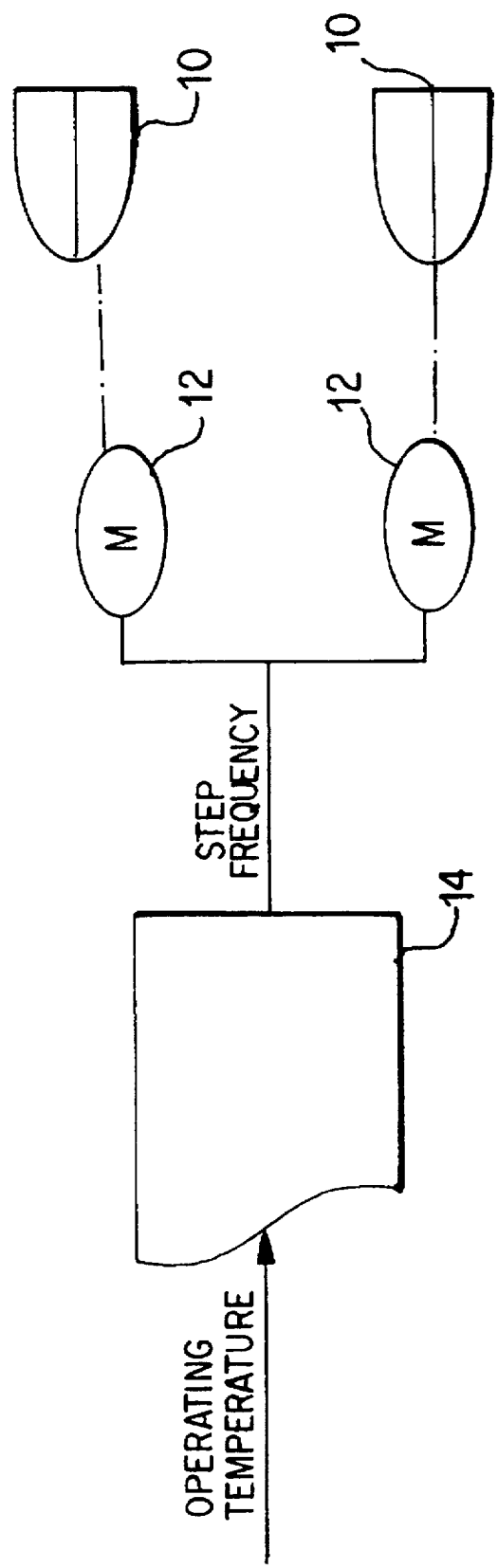
FIG. 1 is a schematic block diagram of a device according to the present invention.

FIG. 1 is a schematic block diagram of the device for adjusting the tilt level or inclination of a motor vehicle headlight. The device includes headlights 10 which each are operatively coupled to a respective stepping motor 12. The stepping motors 12 are driven via a control unit 14. The stepping motor 12 associated with each headlight 10 operates to adjust the tilt level or inclination of the motor vehicle headlight.

Referring to FIG. 2, the relationship between the operating force of the headlight and the temperature of the stepping motor and/or the headlight for different stepping frequencies is graphically represented.

For the sake of simplicity it is assumed that the stepping motor 12 and the headlight 10 have approximately the same temperature. In the following, no distinction will be made between the possibly different temperatures of the motor and headlight.

The prevailing operating temperature extends for example from −40° to 120° C. The adjusting force for the range from −40° to +20° C. decreases directly with the operating temperature on the one hand, and inversely with the stepping frequency on the other. A low adjusting force generally means that steps that might have been commanded can no longer be performed, since the adjusting force is insufficient to actually move the headlight. This case is particularly understandable when low temperatures are being considered. At these temperatures, the headlight movement has pronounced sluggishness. There is also the danger, however, that a preset number of steps, 500 for example, will not be completely executed and that for example the adjustment of the headlight actually corresponds to a number of steps that is 10% below the set number of steps. However, the tilt of the headlight is then not correct. This even applies when a reference run "against the stop" is performed in preparation. The addition of "tolerance steps" to reach the set position, in view of variations during mass production, is not an acceptable approach since the actual scope of the stepping losses cannot be foreseen.

The invention makes use of the demonstrated temperature dependence and stepping frequency dependence of the adjusting force of the stepping motor. At particularly low temperatures, −40° C. in this instance, a stepping frequency (sps =steps per second) of 200 sps is used for example. At higher temperatures, −20° to 0° for example, a higher stepping frequency of 400 sps is chosen for example. Above this point and up to 40° C. the stepping frequency has a value of 500 sps and above 40° C. the force is largely constant.

A critical factor for the selected stepping frequency is the operating temperature of the headlight or stepping motor, which is preferably determined indirectly with the aid of temperature sensors for the outside temperature or the vehicle components, which are present in any case in the motor vehicle. This temperature value is passed to the headlight adjusting device and correspondingly controls the stepping frequency of the stepping motor.

Thus it is possible, without a separate lubricant for the headlight, to compensate for sluggishness at low temperatures. The force that acts at a given operating temperature can be quasi-linearized within a narrow tolerance range. The measure according to the invention can be achieved without additional hardware cost. A special headlight position sensor is not required provided an adjustment to the starting position is performed at definite time intervals, for example when the headlight is switched off.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for adjusting a tilt level of a motor vehicle headlight, comprising:

a stepping motor coupled to the headlight for adjusting a tilt level of the headlight, said stepping motor serving as a drive motor controlled in accordance with a set tilt value; and wherein a stepping frequency of the stepping motor, depending an operating temperature of the headlight, is smaller for low temperatures than for higher temperatures.

2. The device according to claim 1, wherein the operating temperature of the headlight is determined indirectly from at least one of an outside temperature, a motor vehicle component temperature and an operating time of the headlight.

3. A method for adjusting the inclination of a motor vehicle headlight using a stepping motor which adjusts a tilt level of the headlight, the method comprising the steps of:

controlling the stepping motor, functioning as a drive motor, in accordance with a set tilt value;

utilizing a stepping frequency for the stepping motor which, depending on a headlight operating temperature, is smaller for lower temperatures than for higher temperatures.

4. The method according to claim 3, further comprising the step of indirectly determining the headlight operating temperature from at least one of an outside temperature, a motor vehicle component temperature, and an operating time of the headlight.

5. In a method for adjusting a tilt level of a motor vehicle headlight using a stepping motor serving as a drive motor which is controlled in accordance with a set tilt value, the improvement comprising the step of supplying smaller stepping frequency to the stepping motor for low headlight operating temperatures than for higher headlight operating temperatures.

* * * * *